April 29, 1924.

G. M. HIRNING

BRAKE BAND

Filed Jan. 10, 1922

Inventor
George M. Hirning
By Macon Thomas
Attorneys

Patented Apr. 29, 1924.

1,492,170

UNITED STATES PATENT OFFICE.

GEORGE MENKE HIRNING, OF PITTSBURGH, PENNSYLVANIA.

BRAKE BAND.

Application filed January 10, 1922. Serial No. 528,285.

*To all whom it may concern:*

Be it known that I, GEORGE MENKE HIRNING, citizen of the United States, residing at Pittsburgh, in the State of Pennsylvania, have invented certain new and useful Improvements in Brake Bands, of which the following is a specification.

The invention relates to improvements in vehicle brakes, and is particularly adapted for use in connection with motor vehicles, although it of course has application to other fields.

It is an object of the invention to provide a vehicle brake of the band type, wherein the braking pressure is equally and uniformly applied by the brake bands to all portions of the brake drum engaged thereby.

With the foregoing conception in mind, the invention primarily consists of a brake band wherein the band structure instead of being composed of a single piece of material is formed in sections, united at the rear end of the drum by a hinge structure and operable levers connected with the free ends of the sections to apply the braking pressure to the braking drum. By hinging the braking sections it has been discovered that the lining of the said sections will apply a substantially uniform pressure to the entire surface of the drum engaged thereby, thus materially increasing the effective retarding power of the brake.

In the accompanying drawings I have shown several embodiments of the invention, but it will be clearly understood that the invention is susceptible of many changes in structure without departing from the spirit thereof.

In the drawings Figure 1 represents a view of one form of my invention;

Figure 1:
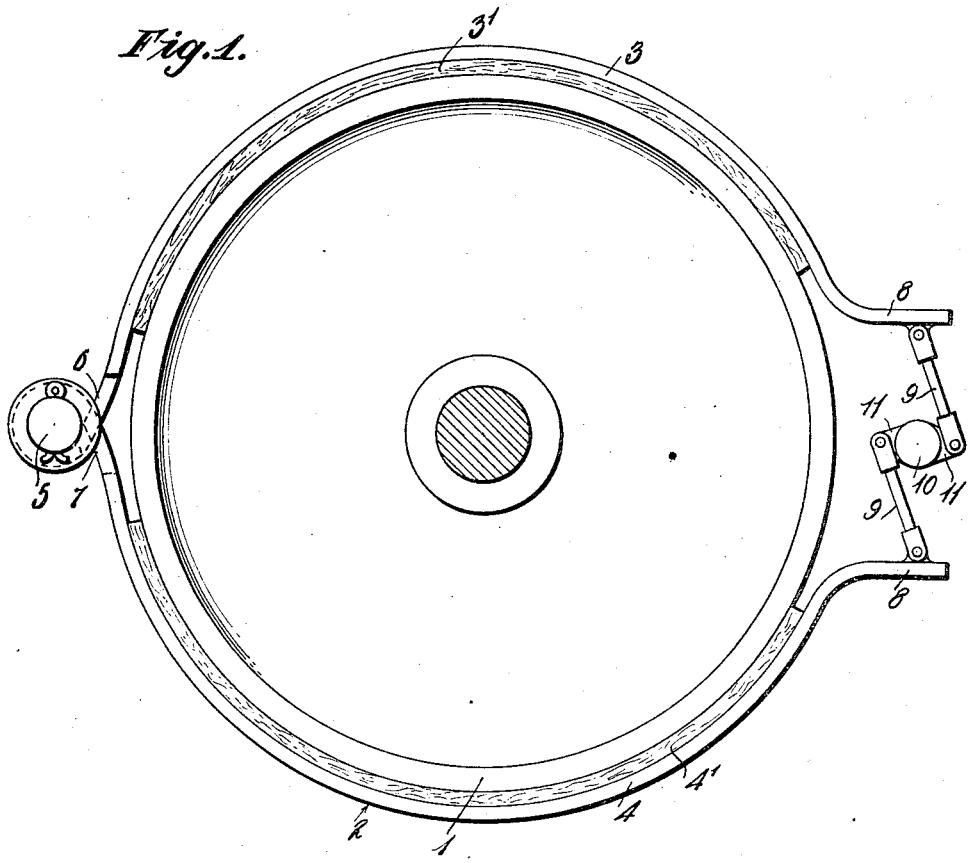

Referring now more particularly to the drawings, wherein like reference characters indicate corresponding parts, the numeral 1 designates a brake drum of the usual construction, which is attached to a vehicle wheel. Surrounding this drum is a brake band 2, which in the present invention is composed of the sections 3 and 4, both sections being of substantially equal length and each carrying the brake lining 3' and 4'.

Figure 2:
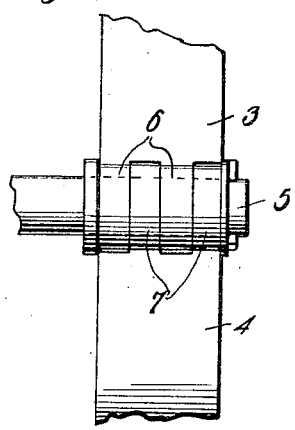
Figure 2 is a detail view of the joint of the structure shown in Figure 1.

It will be observed that the sections 3 and 4 are fashioned at their rear ends to hingedly engage the pintle 5. These sections are constructed with alternate ears 6 and 7 respectively, the ears overlapping, as shown in Figure 2 so as to permit a movement of the brake sections relative to each other about the pintle 5. The ears 6 and 7 are merely bent around the pintle as shown in Figure 1 and constitute hinges for the sections 3 and 4. The sections 3 and 4 at their forward ends are provided with extensions 8, which extensions are drawn toward each other through the agency of brake operating links 9 connected to a rotary member 10 having shoulders 11, the member 10 being operated by the usual brake rod.

Figure 3:
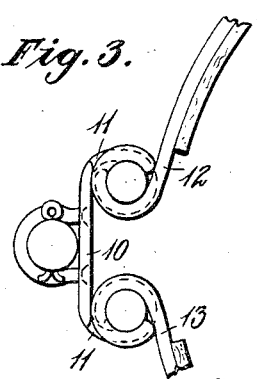
Figure 3 is a modified form of the invention.

In Figure 3 I have shown a modified form of the invention wherein instead of employing the pintle 5 I mount at the rear of the drum a metallic member 10, one end of which is provided with the reduced extensions 11 passing around a pintle, while one end of the brake band 12 is likewise provided with reduced overlapping parts engaging said pintle, the other band 13 being likewise pivotally secured to the metallic member 10 by a similar point. The outer ends of the bands 12 and 13 in this construction are operated in the same manner as the bands 3 and 4 disclosed in Figure 1. From the foregoing it will be seen that I have provided a structure wherein the brake bands are composed of sections, and said sections are hingedly supported whereby upon the actuation of the bands the braking surface thereof due to the half-circle or sectional formation of the bands uniformly and evenly engages the entire braking surface of the drum with which the sections cooperate. When pressure is applied to the sections due to the formation of the band, these sections, as before stated, are caused to bear with equal stress upon all portions of the drum engaged, rather than applying severe pressure to one portion of the drum and little or no pressure to another part thereof, which happens with the usual type of single piece brake band.

Having thus described my invention, what I claim is:

A brake of the character described comprising a brake drum, a braking band cooperating therewith, said band being composed of two sections of the same formation, each section being fashioned to engage the brake band on equal areas, means for pivotally mounting the sections at one end, said means comprising a metallic plate 10, reduced extensions on each side of said plate, adapted to engage and secure pintles therein, said brake band sections being provided with extensions also secured to said pintles and adapted for pivotal connection therewith, and means for causing the brake sections to engage and grip the brake drum.

In testimony whereof I hereby affix my signature.

GEORGE MENKE HIRNING.